United States Patent
Tamai et al.

[19]

[11] Patent Number: 5,898,293
[45] Date of Patent: Apr. 27, 1999

[54] METHOD OF PREVENTING BATTERY OVER-DISCHARGE AND A BATTERY PACK WITH A BATTERY OVER-DISCHARGE PREVENTION CIRCUIT

[75] Inventors: Mikitaka Tamai, Tsuna-gun; Kouji Negoro, Sumoto, both of Japan

[73] Assignee: Sanyo Electric Co., Ltd., Osaka, Japan

[21] Appl. No.: 08/898,319

[22] Filed: Jul. 22, 1997

[30] Foreign Application Priority Data

Jul. 30, 1996 [JP] Japan ................................ 200130/96

[51] Int. Cl.$^6$ .......................... H01M 10/44; H01M 10/46
[52] U.S. Cl. .............................................................. 320/136
[58] Field of Search ................................. 320/124, 128, 320/132, 134, 135, 136, 163, FOR 112, FOR 120, FOR 131, FOR 138, FOR 147, FOR 148, DIG. 21

[56] References Cited

U.S. PATENT DOCUMENTS 5,477,124  12/1995  Tamai ...................................... 320/135
5,705,911  1/1998   Tamai ...................................... 320/134
5,742,148  4/1998   Sudo et al. ............................. 320/134

FOREIGN PATENT DOCUMENTS 4-33271  2/1992  Japan .

*Primary Examiner*—Edward H. Tso
*Attorney, Agent, or Firm*—Wenderoth, Lind & Ponack, L.L.P.

[57] ABSTRACT

The method of preventing battery over-discharge measures battery voltage with a control circuit, and switches an over-discharge protection switch connected in series with the batteries off with the control circuit when battery voltage drops below a minimum set voltage. Once the over-discharge protection switch turns to an off state, the off voltage at the output side of the switch is measured, and the over-discharge protection switch is held in the off state by this off voltage. When battery voltage rises above the minimum set voltage, return of the over-discharge protection switch to the on state is prevented.

18 Claims, 4 Drawing Sheets

METHOD OF PREVENTING BATTERY OVER-DISCHARGE AND A BATTERY PACK WITH A BATTERY OVER-DISCHARGE PREVENTION CIRCUIT

BACKGROUND OF THE INVENTION

This invention relates to a method of preventing over-discharge of a battery, and to a battery pack which uses that method. In particular, this invention relates to an over-discharge prevention method and battery pack optimized for lithium ion rechargeable batteries.

Turning to FIG. 1, a circuit diagram of a battery pack which contains a battery over-discharge prevention circuit is shown. The battery pack in this figure has an over-discharge protection switch 3 connected in series with batteries 1. When battery voltage drops below a minimum set voltage, the over-discharge protection switch 3 is turned on to prevent over-discharge of batteries 1. The over-discharge protection switch 3 is switched on and off by the control circuit 4. The control circuit 4 detects battery voltage and switches the over-discharge protection switch 3 off when battery voltage drops below the minimum set voltage.

A field effect transistor (FET) is used as the over-discharge protection switch 3. This is because FET internal resistance in the on state is small, and voltage drop and power loss can be minimized. The FET has a parallel connected parasitic diode. The parasitic diode maintains the FET in an on state with respect to current flowing in the reverse direction. As a result for example, even if battery voltage drops below the minimum set voltage and the FET over-discharge protection switch 3 is turned off, it is still possible to charge the batteries 1.

The battery pack protection circuit shown in FIG. 1 operates in the following manner to prevent over-discharge of batteries 1.

(1) When battery voltage is greater than the minimum set voltage, the control circuit 4 holds the over-discharge protection switch 3 in the on state.

(2) When the batteries 1 are discharged and battery voltage drops below the minimum set voltage, the control circuit 4 turns the over-discharge protection switch 3 off to prevent over-discharge of the batteries 1. When the over-discharge protection switch 3 is turned off, current cannot flow in a direction which discharges the batteries 1 and discharge is stopped.

When battery voltage drops below the minimum set voltage in a battery pack which operates as described above, the over-discharge protection switch is turned off. Since load current cannot flow once the over-discharge protection switch is turned off, battery voltage rises. When battery voltage rises above the minimum set voltage, the over-discharge protection switch turns on allowing load current to flow, and battery voltage once again drops. When battery voltage rises and falls in this manner, the over-discharge protection switch is turned on and off and the batteries are repeatedly connected to and cut-off from the load.

To avoid this problem, a battery pack having hysteresis between the minimum set voltage for turning the over-discharge protection switch off and the reset voltage for restoring the over-discharge protection switch to the on state was developed and cited in Japanese Non-examined Patent Publication No. 4-33271 issued Feb. 4, 1992. Specifically, battery pack reset voltage was set higher than the minimum set voltage. The hysteresis voltage or the difference between the reset voltage and the minimum set voltage was, for example, from 0.5V to 5V per cell for the battery pack of this disclosure. When the hysteresis voltage was too small, the over-discharge protection switch would switch on and off causing switch chattering. To avoid this problem, hysteresis voltage was made larger. Large hysteresis voltage resulted in failure of the over-discharge protection switch to turn on during battery charging which made efficient battery charging impossible. Consequently, the battery pack cited in this disclosure had the drawback that hysteresis voltage was difficult to set.

The present invention was developed to overcome this drawback. Thus it is a primary object of the present invention to provide a method of preventing battery over-discharge and a battery pack which uses that method that can avoid over-discharge protection switch chattering with an extremely simple method and circuit.

The above and further objects and features of the invention will more fully be apparent from the following detailed description with accompanying drawings.

SUMMARY OF THE INVENTION

In the method of preventing battery over-discharge of the present invention, an over-discharge protection switch connected in series with the batteries is turned off by a control circuit to prevent over-discharge when battery voltage drops below a minimum set voltage.

The control circuit detects battery voltage and turns the over-discharge protection switch off when battery voltage drops below the minimum set voltage. When the over-discharge protection switch is turned off, battery voltage no longer appears at the output side of the over-discharge protection switch. Consequently, after the over-discharge protection switch is turned off, this off voltage is detected and the over-discharge protection switch is thereby maintained in the off state. Once the over-discharge protection switch is turned off and maintained off by detection of the off voltage, it will not return to the on state even though battery voltage rises above the minimum set voltage. Therefore, once battery voltage drops below the minimum set voltage, no intermittent operation of the over-discharge protection switch will occur.

The control circuit detects voltage at the output side of the over-discharge protection switch and maintains that switch in the off state. During battery charging, the voltage at the output side of the over-discharge protection switch is raised to the charging voltage. Therefore, during charging, the control circuit resets the over-discharge protection switch to the on state.

The battery pack of the present invention is provided with an over-discharge protection switch which is connected in series with the batteries and which prevents battery over-discharge by switching off when battery voltage drops below the minimum set voltage. The battery pack is also provided with a control circuit which detects battery voltage and turns the over-discharge protection switch off when battery voltage drops below the minimum set voltage.

The control circuit is provided with a voltage detection circuit, and a switching circuit connected to the output of the voltage detection circuit which switches the over-discharge protection switch on and off. The output of the voltage detection circuit as well as the output side of the over-discharge protection switch are connected to the switching circuit. When battery voltage drops below the minimum set voltage, the voltage detection circuit switches the over-discharge protection switch off via the switching circuit. When the over-discharge protection switch is turned off, the off voltage at the output side of the over-discharge protection switch is input to the switching circuit, and the switching circuit maintains the over-discharge protection switch in the off state.

A feature of the method of preventing battery over-discharge and battery pack of the present invention configured as described above is that after battery voltage has dropped below the minimum set voltage, the over-discharge protection switch will not turn on again to cause chattering even if the battery voltage rises. This reliably eliminates chattering. This is because after the over-discharge protection switch is turned off, that off voltage at the output side of the over-discharge protection switch is used to maintain the switch in the off state.

Since the off voltage at the output side of the over-discharge protection switch maintains the switch in the off state, it is a further feature of the present invention that circuits such as a hysteresis adjustment circuit are unnecessary, and chattering can be reliably prevented with a circuit which is simple beyond comparison. This is because the circuit to maintain the over-discharge protection switch in the off state is simply provided by supplying the off voltage at the output side of the over-discharge protection switch.

Further, chattering is not prevented in the present invention by adjusting a hysteresis voltage, but rather by detecting the voltage at the output side of the over-discharge protection switch to maintain the switch in the off state. Therefore, it is still another feature of the present invention that hysteresis voltage adjustment is unnecessary and the system can be easily, simply, and cheaply manufactured in quantity.

DETAILED DESCRIPTION OF THE INVENTION

Figure 1:
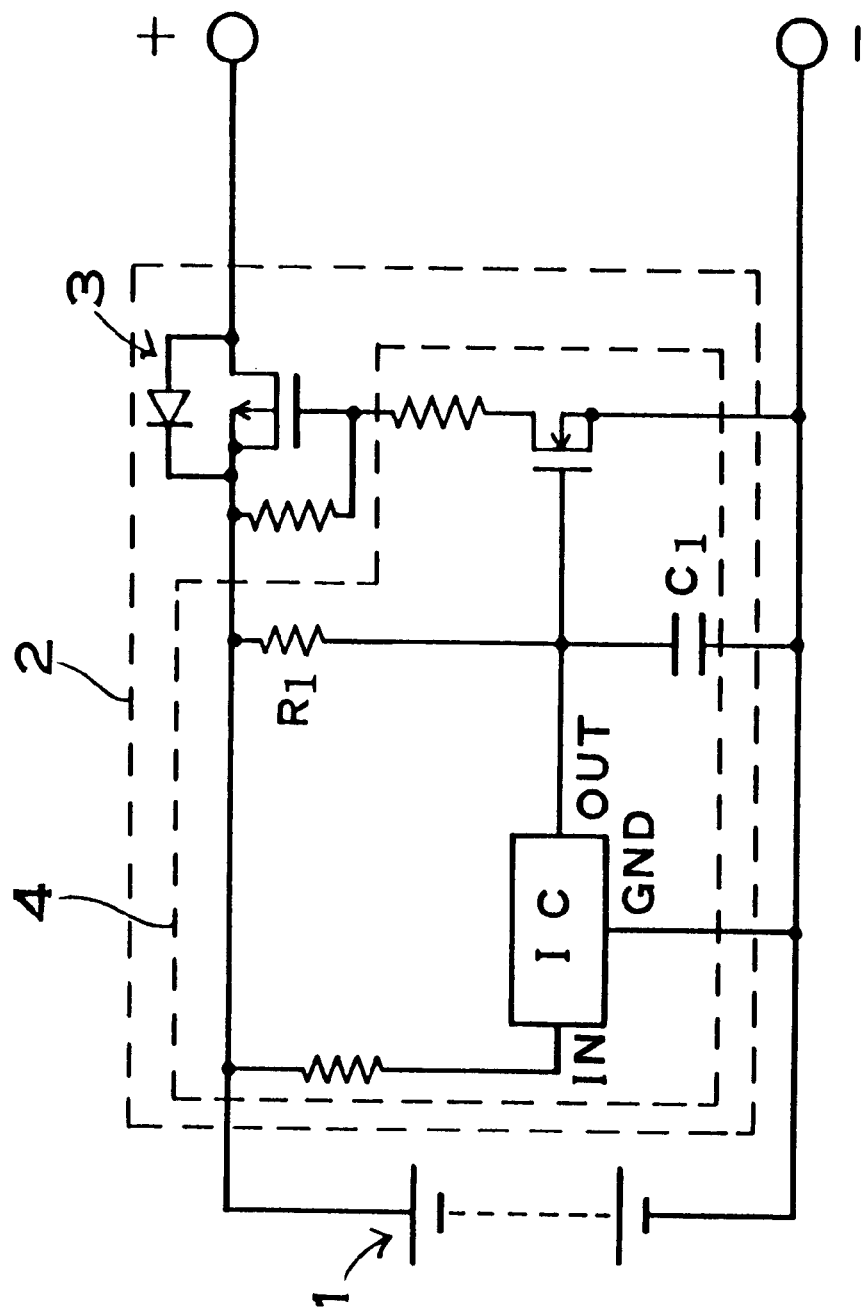
FIG. 1 is a circuit diagram of a battery pack containing a prior art over-discharge protection circuit.
Figure 2:
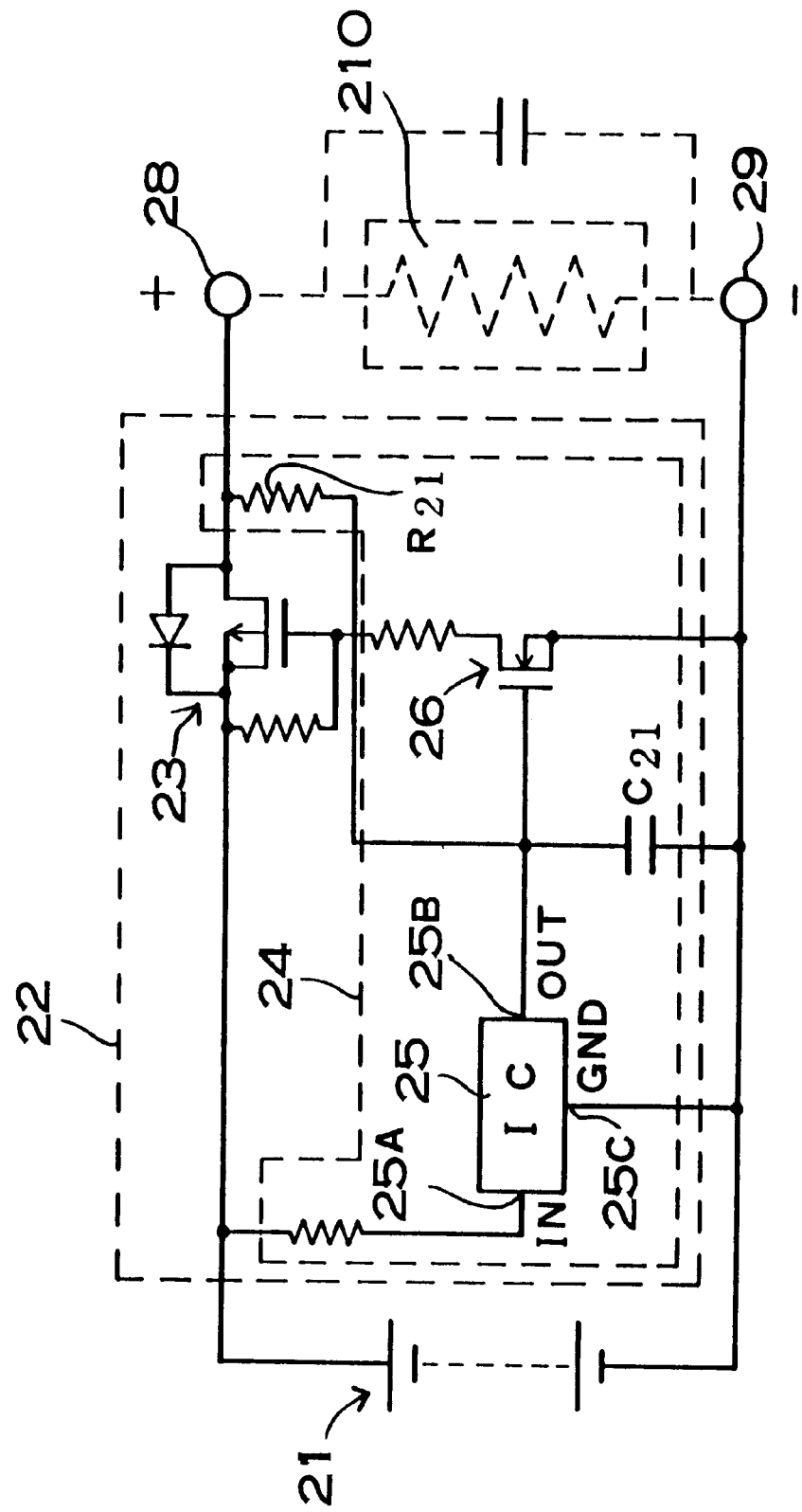
FIG. 2 is a circuit diagram of a battery pack containing a battery over-discharge protection circuit of an embodiment of the present invention.

Turning to FIG. 2, the battery pack shown contains an over-discharge protection circuit 22 for batteries 21. The protection circuit 22 is provided with an over-discharge protection switch 23 connected in series with batteries 21 which prevents battery over-discharge by switching off when battery voltage drops below a minimum set voltage. The protection circuit 22 is also provided with a control circuit 24 which detects battery voltage and switches the over-discharge protection switch 23 on and off.

The over-discharge protection switch 23 is a metal-oxide-semiconductor FET (MOSFET). The MOSFET has a parasitic diode connected in parallel. The parasitic diode allows current to flow in a direction reverse that of the MOSFET. In other words, regardless of the on-off state of the MOSFET, charging current to the batteries is not cut-off. In the battery pack shown in FIG. 2, the MOSFET over-discharge protection switch 23 is connected in series between the positive side of the batteries 21 and the positive output terminal 28. The MOSFET is connected in a manner that prevents discharge current from flowing when it is in the off state.

The control circuit 24 is provided with a voltage detection circuit 25 which measures battery voltage and switches an FET on and off, and a switching circuit 26 which turns the over-discharge protection switch 23 on and off.

The voltage detection circuit 25 is a three-terminal integrated circuit (IC) controller. The voltage detection circuit 25 is provided with a voltage detection terminal 25A which connects to the positive side of the batteries 21 and measures battery voltage, and an output terminal 25B which switches the switching circuit 26 on and off depending on the measured battery voltage.

The controller IC puts the output terminal 25B in a high impedance state when the battery voltage input to the voltage detection terminal 25A is greater than the minimum set voltage. When battery voltage drops below the minimum set voltage, the output terminal 25B is set to ground (GND).

The switching circuit 26 shown in FIG. 2 is an FET. This FET is turned on and off by output from the controller IC which is the voltage detection circuit 25. The FET has its gate connected to the output terminal 25B of the controller IC, its drain connected to the gate of the MOSFET over-discharge protection switch 23, and its source connected to the negative side of the batteries 21. Further, the gate of the FET is connected through a biasing resistor R21 to the output side of the over-discharge protection switch 23 which is the positive side output terminal 28 of the battery pack. The biasing resistor R21 applies bias voltage to the FET which puts it in the on state when the voltage detection circuit 25 output is in the high impedance state.

Further, a capacitor C21 is connected between the gate of the FET and ground. At the instant when the over-discharge protection switch 23 is turned off, it is possible that charge remaining in capacitive components of electrical equipment connected to the battery pack may cause improper operation of the system by turning the FET back on. The capacitor C21 is connected to prevent this improper operation. The capacitor C21 and biasing resistor R21 add a time delay to voltage rise at the gate of the FET. During this time delay, capacitor discharge can occur through the electrical equipment load 210.

The battery pack shown in FIG. 2 prevents over-discharge of batteries 21 by the following operation.

(1) When batteries 21 are sufficiently charged and battery voltage is greater than the minimum set voltage, the following operation takes place.

When lithium ion rechargeable batteries are used as the batteries 21 contained in the battery pack, the minimum set voltage is established to be, for example, 2.30V/cell.

The output of the voltage detection circuit 25 is put in the high impedance state when battery voltage is greater than the minimum set voltage. In this state, bias voltage is applied to the FET switching circuit 26 via the biasing resistor R21. Since the over-discharge protection switch 23 is in the on state, the MOSFET drain, which is the output side of the over-discharge protection switch 23, is essentially at the voltage of the positive side of the batteries 21. Consequently, the FET has bias voltage provided through the biasing resistor R21 and is in the on state. The FET in the on state applies bias voltage to turn on the MOSFET, which is the over-discharge protection switch 23. This is because the FET connects the gate of the MOSFET with ground. In this situation, the MOSFET over-discharge protection switch 23 is in the on state, and power is supplied to electrical equipment or other load 210 connected to the battery pack (2) When the battery pack is discharged and battery voltage drops below the minimum set voltage, the following operation takes places.

The output of the voltage detection circuit 25 goes from the high impedance state to the low impedance state. The gate voltage of the FET switching circuit 26 goes low and the FET is turned off. When the FET is turned off, the MOSFET over-discharge protection switch is also turned off. This is because the gate of the MOSFET is cut-off from its connection to ground. The MOSFET over-discharge protection switch in the off state cuts-off the batteries 21 from the load 210 and suspends battery discharge.

When the MOSFET is turned off, the output terminal 25B of the voltage detection circuit 25 is connected to the negative side output terminal 29 of the battery pack via the load 210. As a result, the voltage at the output side of the over-discharge protection switch 23 becomes ground (or off voltage). This off voltage at the output side of the over-discharge protection switch 23 is supplied back to the gate of the FET via the biasing resist or R21, and forces the FET to be maintained in the off state.

(3) When battery voltage becomes greater than the minimum set voltage after the over-discharge protection switch 23 is turned off, the following operation takes place.

If battery voltage becomes greater than the minimum set voltage after the MOSFET over-discharge protection switch 23 is turned off and load current has been cut-off, output from the voltage detection circuit 25 goes from the low impedance state to the high impedance state. However, even though the output of the voltage detection circuit 25 goes to the high impedance state, off voltage will be maintained at the gate of the FET which is connected to the positive output terminal 28 through biasing resistor R21. Therefore, even though the output of the voltage detection circuit 25 goes to the high impedance state, the FET will not be switched from the off state to the on state. Consequently, even if battery voltage which has dropped below the minimum set voltage becomes greater than that minimum set voltage, the MOSFET over-discharge protection switch 23 will not be switched on by the FET.

Figure 3:
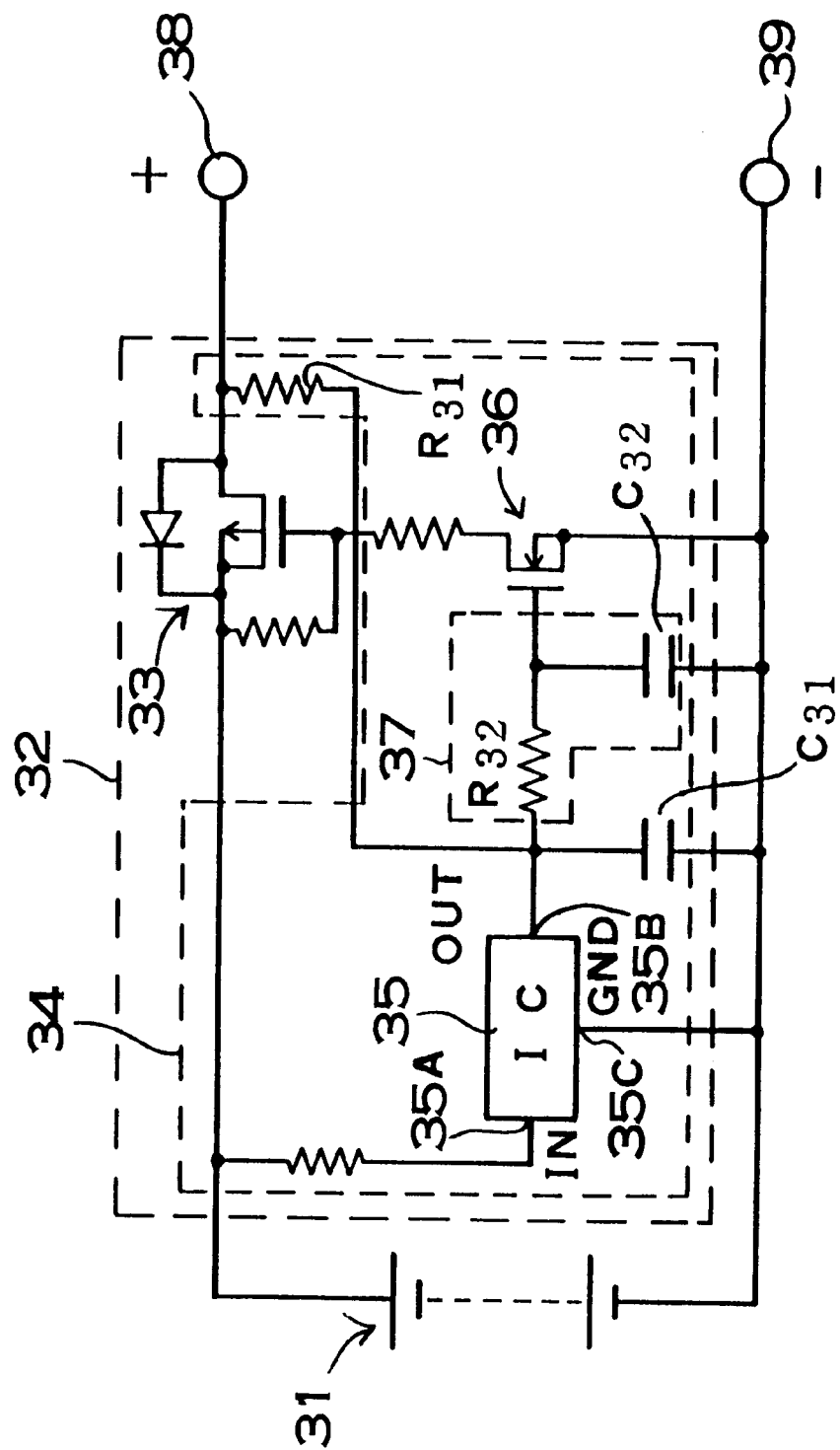
FIG. 3 is a circuit diagram of a battery pack provided with a delay circuit of another embodiment of the present invention.

Turning to FIG. 3, the battery pack shown has a delay circuit 37 connected between the output of the voltage detection circuit 35 and the input of the switching circuit 36. The delay circuit 37 is made up of an integrating circuit with a resistor R32 and a capacitor C32. Resistor R32 is connected between the output of the voltage detection circuit 35 and the gate of the FET, and capacitor C32 is connected between the gate of the FET and ground. The delay circuit 37 switches the FET switching circuit 36 off only when the output of the voltage detection circuit 35 goes low longer than a certain time interval. The delay circuit 37 prevents the FET from being switched from on to off when battery voltage temporarily drops below the minimum set voltage. When pulse current flows from the battery pack to the load, battery voltage drops momentarily. In this situation, the delay circuit 37 prevents the over-discharge protection switch 33 from being turned off.

Figure 4:
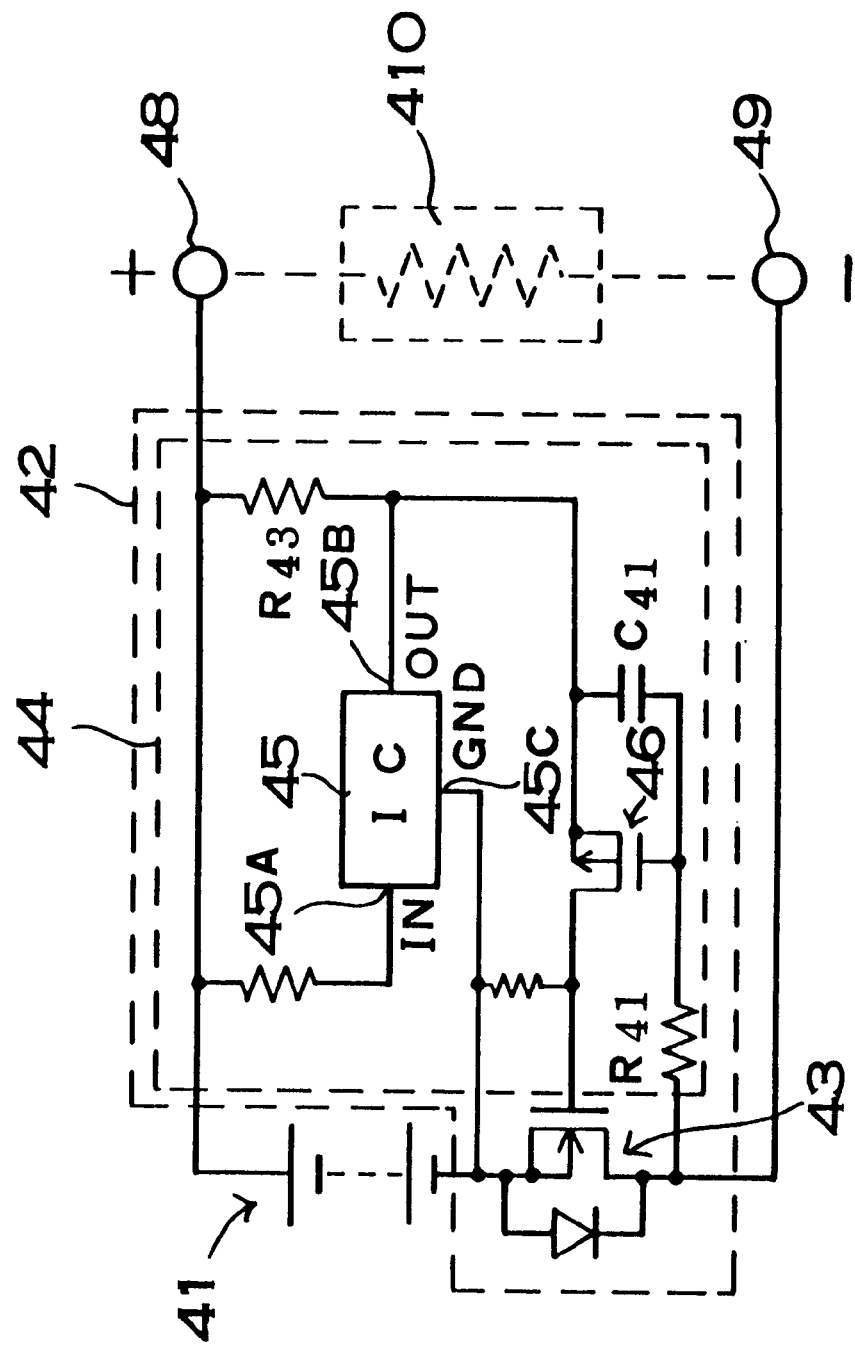
FIG. 4 is a circuit diagram of a battery pack containing a battery over-discharge protection circuit of still another embodiment of the present invention.

Turning to FIG. 4, an n-channel MOSFET is used for the over-discharge protection switch 43. The MOSFET is controlled on and off by switching circuit 46 which is an FET. The FET is switched on and off by the voltage detection circuit 45. When battery voltage is greater than the minimum set voltage, voltage detection circuit 45 output is in the high impedance state, and when battery voltage drops below the minimum set voltage, output goes to the low impedance state; namely output is connected to the ground line 45C. The FET switching circuit 46 is switched on by voltage detection circuit 45 output in the high impedance state and is switched off by output in the low impedance state. The MOSFET over-discharge protection switch 43 is controlled on when the FET is on and off when the FET is off.

To achieve this type of operation, the voltage detection circuit 45 of the battery pack of FIG. 4 has its input side connected to the positive side of the batteries 41, its ground line 45C connected to the negative side of the batteries 41, and its output side connected to the source of the FET. The output side of the voltage detection circuit 45 is connected to the positive side of the batteries 41 through a pull-up resistor R43. When the output of the voltage detection circuit 45 is in the high impedance state, the pull-up resistor R43 applies positive voltage to the source of the FET. The FET switching circuit 46 has its gate connected to the output side of the over-discharge protection switch 43 through a biasing resistor R41, its source connected to the out of the voltage detection circuit 45, and its drain connected to the gate of the MOSFET over-discharge protection switch 43.

The battery pack shown in FIG. 4 prevents battery over-discharge by the following operation.

(1) When batteries 41 are sufficiently charged and battery voltage is greater than the minimum set voltage, the following operation takes place.

The output of the voltage detection circuit 45 is put in the high impedance state when battery voltage is greater than the minimum set voltage. In this state, the FET switching circuit 46 has its source connected to the positive side of the batteries 41, its drain connected to the negative side of the batteries 41, and its gate connected to the negative side of the batteries 41 through biasing resistor R41; and it is in the on state. The gate of the FET is connected to the negative side of the batteries 41 through the MOSFET, and since the MOSFET is in the on state, bias voltage is applied to the FET.

The FET in the on state applies bias voltage to the MOSFET to hold it in the on state. This is because the FET connects the gate of the n-channel MOSFET to the positive side of the batteries 41. In this state, the MOSFET over-discharge protection switch 43 is on and power is supplied to a load 410 such as electrical equipment connected to the battery pack.

(2) When the battery pack is discharged and battery voltage drops below the minimum set voltage, the following operation takes place.

The output of the voltage detection circuit 45 goes from the high impedance state to the low impedance state. When the output of the voltage detection circuit 45 goes to the low impedance state, the output gets connected to the ground line 45C, and the source of the FET gets connected to the negative side of the batteries 41. Consequently, both the source and drain of the FET are connected to the negative side of the batteries 41 and the device turns off because no voltage appears across the source and drain. When the FET turns off, the MOSFET over-discharge protection switch 43 also turns off. This is because the gate of the MOSFET is no longer connected to positive side of the batteries 41 through the FET. The MOSFET over-discharge protection switch 43 in the off state cuts-off the batteries 41 from the load 410 and suspends battery discharge.

(3) When battery voltage becomes greater than the minimum set voltage after the over-discharge protection switch 43 is turned off, the following operation takes place.

When the MOSFET is turned off, the negative output terminal 49 of the battery pack is connected with the positive output terminal 48 through the load 410. In this situation, the source of the FET switching circuit 46 is connected to the positive side of the batteries 41 through the pull-up resistor R43 and the gate is also connected to positive side of the batteries 41 through biasing resistor R41 and load 410. With both its source and gate connected through resistors to the positive side of the batteries 41, the FET is forced to maintain the off state.

When battery voltage becomes greater than the minimum set voltage after the MOSFET over-discharge protection switch 43 has turned off and load current has been cut-off, output of the voltage detection circuit 45 goes from the low impedance state to the high impedance state. Even if the output of the voltage detection circuit 45 goes to the high impedance state, both the gate and source of the FET are connected to positive side of the batteries 41 and FET gate voltage is maintained off. Further, in the high impedance state, when the load 410 is disconnected, the FET gate voltage is maintained off because the MOSFET is off. Therefore, even when the output of the voltage detection circuit 45 goes to the high impedance state, the FET will not be switched from off to on. Consequently, even when battery voltage which has dropped below the minimum set voltage becomes greater than the minimum set voltage, the MOSFET over-discharge protection switch 43 will not be turned on by the FET.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of preventing battery over-discharge, for use with batteries, an over-discharge protection switch, having an on state and an off state, connected in series with the batteries, and a control circuit operable to switch the over-discharge protection switch to the off state when the voltage of the batteries drops below a minimum set voltage, wherein the over-discharge protection switch has an output side, said method comprising:

measuring a voltage of the batteries with the control circuit;

switching the over-discharge protection switch to the off state when the voltage of the batteries drops below the minimum set voltage;

measuring an off voltage at the output side of the over-discharge protection switch when the over-discharge protection switch is off;

maintaining the over-discharge protection switch in the off state with the off voltage; and preventing the over-discharge protection switch from returning to the on state when the voltage of the batteries rises above the minimum set voltage.

2. A method of preventing battery over-discharge as claimed in claim 1, wherein the batteries are lithium ion rechargeable batteries.

3. A method of preventing battery over-discharge as claimed in claim 2, further comprising establishing the minimum set voltage to be 2.3 V/cell.

4. A method of preventing battery over-discharge as claimed in claim 1, wherein a MOSFET is used as the over-discharge protection switch.

5. A method of preventing battery over-discharge as claimed in claim 1, further comprising resetting the over-discharge protection switch to the on state when the batteries are charged.

6. A method of preventing battery over-discharge as claimed in claim 1, further comprising switching the over-discharge protection switch to the off state when the voltage of the batteries is lower than the minimum set voltage for a period of time longer than a set time interval.

7. A battery pack comprising:

batteries operable to exhibit a voltage;

an over-discharge protection switch, having an on state and an off state, connected in series with said batteries and operable to switch to the off state to prevent an over-discharge of said batteries when the voltage of said batteries drops below a minimum set voltage, wherein said over-discharge protection has an output side;

a control circuit operable to measure the voltage of said batteries and to switch said over-discharge protection switch to the off state;

a voltage detection circuit, in said control circuit, operable to measure the voltage of said batteries, said voltage detection circuit having an output; and a switching circuit, in said control circuit, connected to said output of said voltage detection circuit, operable to control said over-discharge protection switch so as to switch said over-discharge protection switch to one of the on state and the off state;

wherein said output of said voltage detection circuit and said output side of said over-discharge protection switch are connected to said switching circuit, said voltage detection circuit is operable to switch said over-discharge protection switch to the off state via said switching circuit when the voltage of said batteries drops below the minimum set voltage, said over-discharge protection switch exhibits an off voltage at said output side of said over-discharge protection switch and at said switching circuit when said over-discharge protection switch is in the off state, and said switching circuit is operable to maintain said over-discharge protection switch in the off state when the off voltage of said over-discharge protection switch is exhibited at said switching circuit.

8. A battery pack as claimed in claim 7, wherein said batteries are lithium ion rechargeable batteries.

9. A battery pack as claimed in claim 8, wherein the minimum set voltage is 2.3 V/cell.

10. A battery pack as claimed in claim 7, wherein said over-discharge protection circuit is a MOSFET.

11. A battery pack as claimed in claim 10, wherein said MOSFET has a gate, and said switching circuit is a FET connected to said gate of said MOSFET.

12. A battery pack as claimed in claim 11, wherein said FET has a gate, and said battery pack further comprises a capacitor connected to said gate of said FET.

13. A battery pack as claimed in claim 10, wherein said batteries have a positive side terminal, said battery pack has a positive side terminal, and said MOSFET is a p-channel FET connected between said positive side terminal of said batteries and said positive side terminal of said battery pack.

14. A battery pack as claimed in claim 10, wherein said batteries have a negative side terminal, said battery pack has a negative side terminal, and said MOSFET is an n-channel FET connected between said negative side terminal of said batteries and said negative side terminal of said battery pack.

15. A battery pack as claimed in claim 7, wherein said control circuit has a delay circuit.

16. A battery pack as claimed in claim 15, wherein said control circuit is operable to switch said over-discharge protection circuit to the off state when the voltage of said batteries drops below the minimum set voltage for a period longer than a set time interval of said delay circuit.

17. A battery pack as claimed in claim 15, wherein said delay circuit is connected between said voltage detection circuit and said switching circuit, and said delay circuit is operable to delay the output of said voltage detection circuit and to input the output of said voltage detection circuit to said switching circuit.

18. A battery pack as claimed in claim 7, wherein said over-discharge protection switch is operable to reset to the on state when said batteries are charged.

* * * * *